United States Patent [19]
Feinleib

[11] 4,141,652
[45] Feb. 27, 1979

[54] SENSOR SYSTEM FOR DETECTING WAVEFRONT DISTORTION IN A RETURN BEAM OF LIGHT

[75] Inventor: Julius M. Feinleib, Cambridge, Mass.

[73] Assignee: Adaptive Optics Associates, Inc., Cambridge, Mass.

[21] Appl. No.: 854,912

[22] Filed: Nov. 25, 1977

[51] Int. Cl.² ............................................. G01J 1/20
[52] U.S. Cl. ..................................... 356/121; 250/201
[58] Field of Search ............... 356/121; 350/360, 167; 250/201

[56] References Cited
U.S. PATENT DOCUMENTS

| | | | |
|---|---|---|---|
| 3,923,400 | 12/1975 | Hardy | 356/107 |
| 3,980,879 | 9/1976 | O'Meara | 250/201 |
| 3,988,608 | 10/1976 | O'Meara | 250/201 |

*Primary Examiner*—John K. Corbin
*Assistant Examiner*—R. A. Rosenberger
*Attorney, Agent, or Firm*—David E. Brook

[57] ABSTRACT

An improved apparatus for sensing wavefront distortions in a return beam of light, such as a beam returned through a turbulent atmosphere or through an imperfect optical system from a radiating or illuminated object is disclosed. This apparatus includes the components typically present in a Hartmann-type wavefront sensor, and additionally includes means to provide a modulated reference beam of light which is combined with the return beam. The use of a modulated reference beam eliminates the necessity for precise optical alignment, which is difficult or impossible to maintain in most operating environments.

12 Claims, 7 Drawing Figures

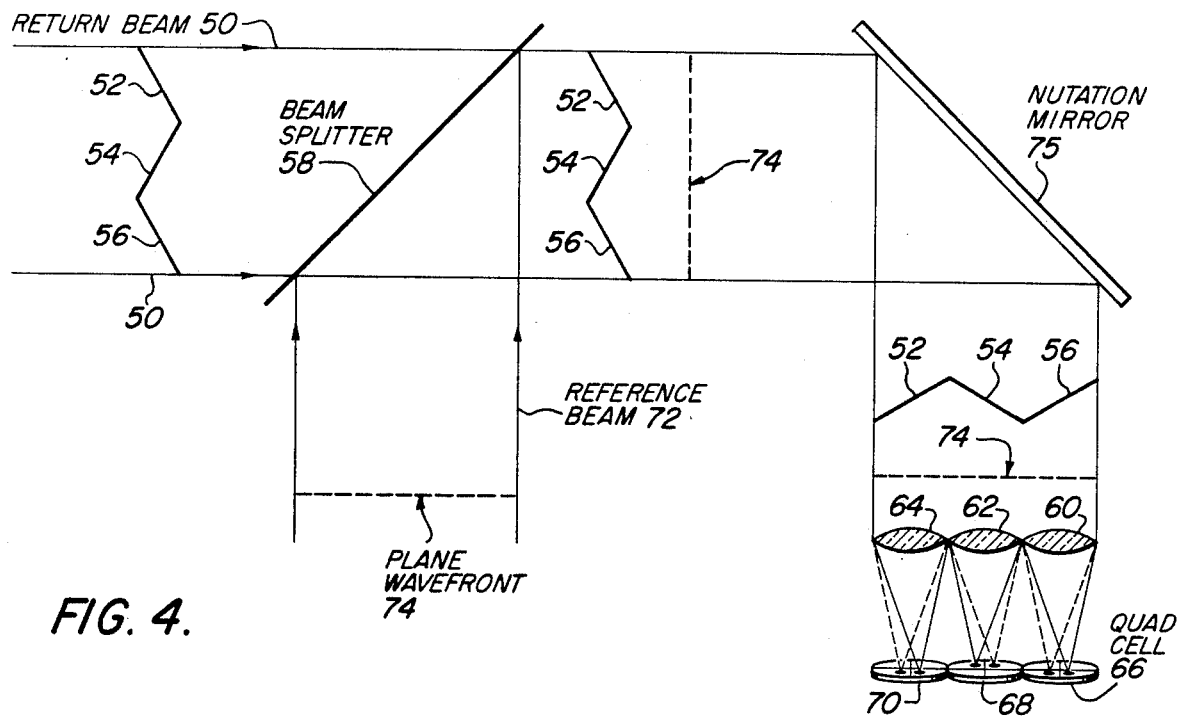
FIG. 4.
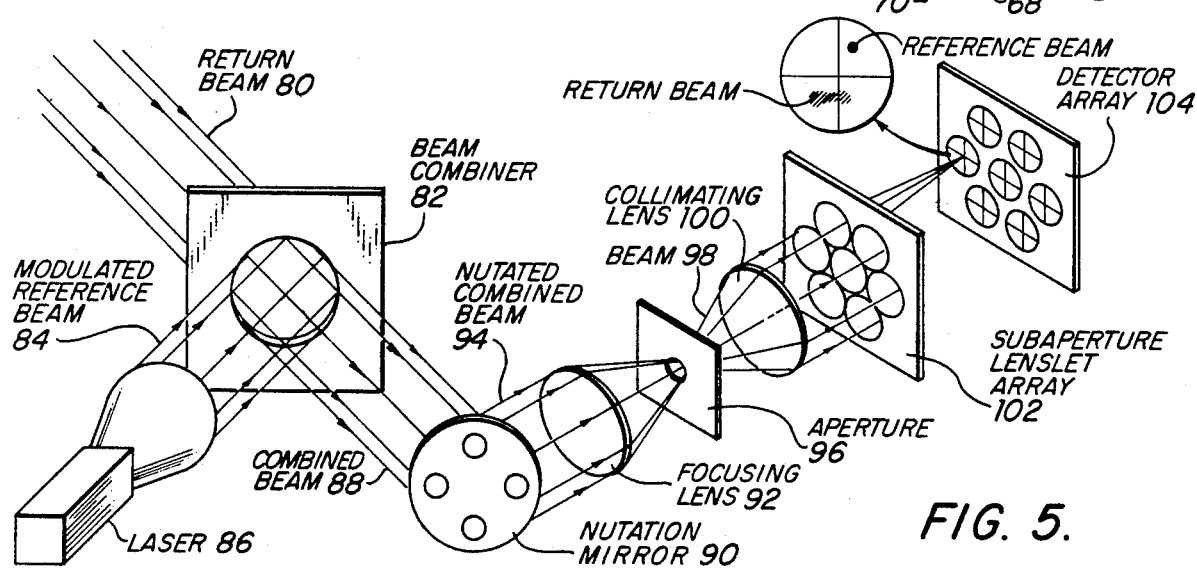
FIG. 5.
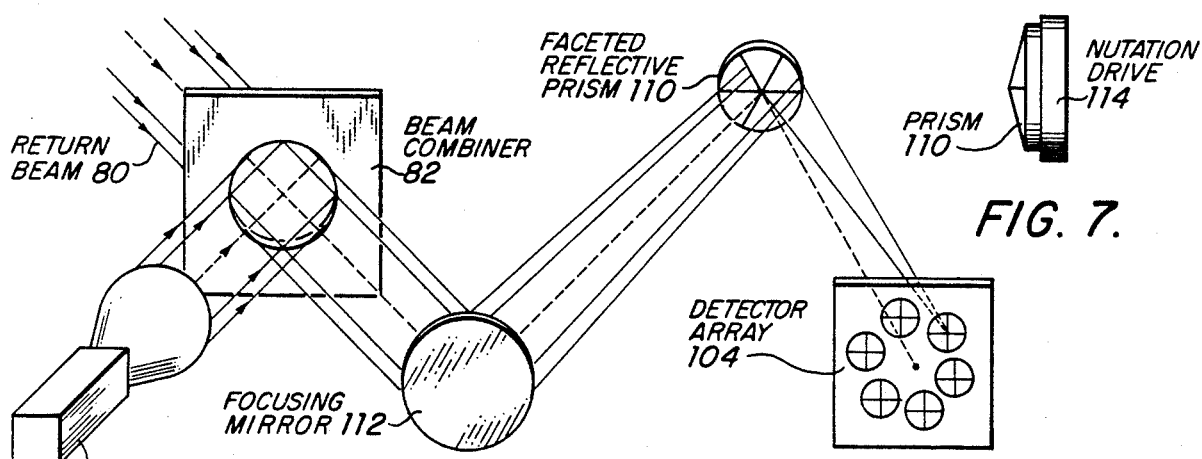
FIG. 6.
FIG. 7.

SENSOR SYSTEM FOR DETECTING WAVEFRONT DISTORTION IN A RETURN BEAM OF LIGHT

BACKGROUND OF THE INVENTION

1. Field of the Invention

This invention is in the field of adaptive optics systems and more particularly relates to apparatus for sensing wavefront distortions in a return beam of light.

2. Description of the Prior Art

It is known that a light beam can be significantly distorted as it passes through the atmosphere. This problem, for example, has limited the resolution of images received by telescopes of stellar bodies deep in space. In addition, atmosphereic distortion has posed a severe restriction on attempts to irradiate objects with laser beams when those objects are located great distances from the emitting laser. Other distortions present in practical optical systems also add to reduce the resolution of systems both for viewing an object or irradiating the object.

To overcome distortions of these types, it has been proposed that adaptive optical systems be employed. Such systems are designed to sense wavefront distortions and to compensate for them by adding compensating modifications in the outgoing laser beam wavefront, in the case where the object is being irradiated, or by adding compensations to the optical path when viewing an object.

The system concepts for adaptive optical systems used to irradiate an object currently fall into two general categories. These are: (1) outgoing wave modulated systems; and (2) return wave wavefront measurement systems such as those employing shearing interferometers.

Outgoing wave systems tag a wavefront by modulating the outgoing laser beam. The object irradiance due to the arrival of the radiation from a given subaperture of the transmitting telescope may be tracked by detecting a reflected return with this differentiating modulation. Irradiance is maximized by making wavefront adjustment on the subaperture to maximize the tagged radiation received back from the irradiated object.

Return wave systems use light returned from an irradiated object to measure aberrations in the optical path between the object and focal plane of the optical system. By making these measurements on the return wavefront, as received by the same optical aperture that transmitted the radiation beam, the aberrations at each subaperture can be determined and appropriate adjustments made in the optical path of the subaperture to compensate exactly for these errors. Such return wave systems require that the measuring system and laser share the identical optical paths so that measurements correspond precisely with the laser wavefront passing through a particular subaperture of the transmitter optics. In addition, return wave systems can use the light emanating from an object to improve the image of that object when viewed through the same optical system used to make the wavefront measurement.

Adaptive optical systems which have been described in the patent literature include those by O'Meara in U.S. Pat. Nos. 3,731,103; 3,975,629; 3,979,585; 3,988,608; and 4,016,415. Another is the real-time wavefront correction system described by Hardy in U.S. Pat. No. 3,923,400.

Hartmann wavefront sensors have been proposed for use in adaptive optical systems of return wave type. Conventional Hartmann wavefront sensors employ a detector array of photosensitive cells, each of which samples a portion of the light entering an aperture of an optical system. The subaperture portions are focused by a lenslet array onto the individual photosensitive cells which detect the position of the focused subaperture beam portions, and are indicative of the wavefront tilt of the optical beam.

Hartmann-type sensors are unique compared to other systems, such as those employing a chopper wheel because they collect and sample virtually 100% of the light entering the optical system. Additionally, the wavefront tilt over the subapertures can be measured even when the phase of the light from one side to the other exceeds two waves. The systems are limited only by the size of the cell detectors. Hartmann-type sensors can also detect wavefront tilts in non-coherent sources of white light sources because they are independent of wavelength and only depend on the angle of tilt of the wavefront. Additionally, Hartmann-type sensors are well suited to adaptive optical systems since they measure tilt angles of wavefronts, and not optical phase differences. This tilt angle is exactly what is needed to compensate for optical path errors independent of wavelength.

Despite these unique advantages, Hartmann-type sensors have not been widely accepted for use in adaptive optical systems because they have heretofor suffered from significant disadvantages. For example, they have normally been used for static (d.c.) measurements of the centroid position of each subaperture. D.C. centroid detectors are relatively noisy and produce a very low signal-to-noise ratio for measurements of wavefronts emitted from weak sources. In addition, a major disadvantage of previously designed Hartmann-type sensors was the requirement for extremely accurate and stable optical-mechanical alignment. Without this, such systems could not accurately detect the position of subaperture centroids reproducibly. This was a severe handicap for systems requiring fast, dynamic measurements of wavefront distortion. In such systems, it was virtually impossible to maintain accurate optical-mechanical positioning in practical operational environments.

SUMMARY OF THE INVENTION

This invention relates to sensor systems for detecting wavefront distortions in a return beam of light, and simply stated is an improved Hartmann-type wavefront sensor system.

The apparatus of this invention includes means for emitting a modulated reference beam and means for combining the modulated reference beam with a return beam of light which will be analyzed for wavefront distortion. The reference light beam may be, for example, a modulated laser beam having a plane wavefront. Means for dividing the combined light beam into a plurality of subaperture components and means for focusing each subaperture component onto a photosensitive means for detecting position are employed. The photosensitive means might be a photodetector, such as a quad cell, which is capable of detecting the position of both of the focused return and reference beams thereon. Finally, electronic means are employed for determining the wavefront tilt of the return beam from the relative positions sensed for the return and reference beams for each of the subaperture components. In a particularly preferred embodiment, a nutation is applied to the combined light beam to produce an a.c. signal at the detector output and to aid in employment of electronic processing of the output of the photodetectors.

Because the sensor apparatus disclosed herein employs a reference wavefront, the sensitivity of measurements to precise mechanical alignment is eliminated. It is the relative position only between the return signal and reference signal that is crucial. From the relative positions detected, the electronic means is able to determine the tilt error in each subaperture component of the return light beam.

Only one reference wavefront need be used even though there are a plurality of subaperture components. Each subaperture component tilt can be measured using this common plane wave as a reference. Additionally, amplitude modulation of the reference wavefront can be employed so that the position of the reference can be easily separated from the signal centroid emanating from the return beam by the electronic components. Furthermore, by nutating the combined light beam, an a.c. signal for the centroid of each individual beam is provided.

In general, the improved sensor system described herein retains the inherent optical efficiency of Hartmann-type sensors, but eliminates the practical engineering problems heretofor experienced with such sensors.

BRIEF DESCRIPTION OF THE DRAWINGS

FIG. 4 is a schematic illustration of a modified embodiment of the improved Hartmann-type sensor of FIG. 3;

FIG. 5 is a perspective view of the optical components in an improved sensor for wavefront distortions according to this invention;

FIG. 6 is a perspective view of the optical components in an alternative embodiment to that shown in FIG. 5; and, FIG. 7 is a side elevational view of a faceted reflective prism mounted on a nutation drive.

DESCRIPTION OF PREFERRED EMBODIMENTS

The invention will now be further described by referring to the figures in more detail.

Figure 1:
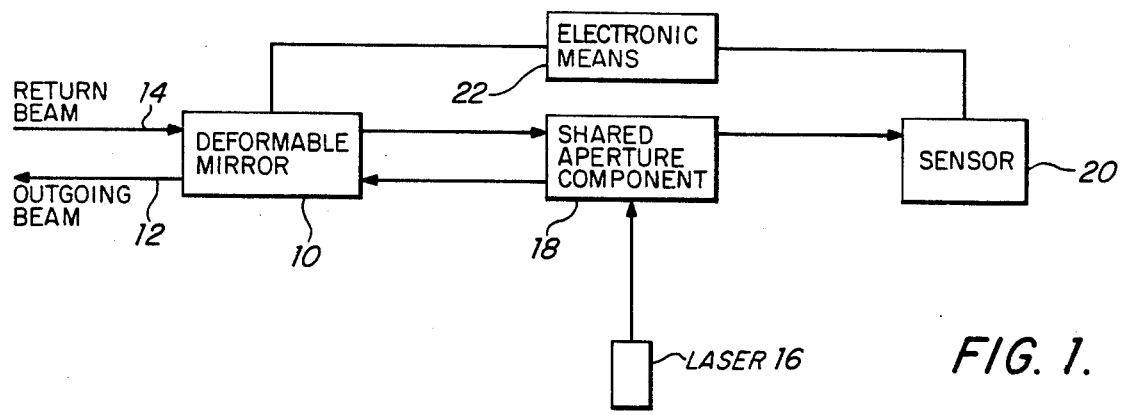
FIG. 1 is a block diagram illustrating a typical adaptive optical system employing wavefront distortion sensors of the type described herein.

FIG. 1 is a block diagram illustrating an adaptive optical system of the type in which the improved wavefront distortion sensors, as described herein, may be used. The heart of such system is usually a deformable mirror 10 which is used to modulate outgoing beam 12 to exactly compensate for distortions detected in return beam 14. Outgoing beam 12 originates from laser 11 and is directed to deformable mirror 10 by shared aperture component 18, which may be, for example, a beam splitter. Outgoing beam 12 is used to irradiate an object, and return beam 14 is reflected or scattered light originating from beam 12 which is returned, or may be other optical radiation leaving the object and returning to the optical system. Return beam 14 is reflected from deformable mirror 10 and passes through shared aperture component 18 to sensor 20. Electrical means 22 convert the distortions sensed into appropriate deformation on deformable mirror 10 to exactly compensate for these distortions.

Figure 2:
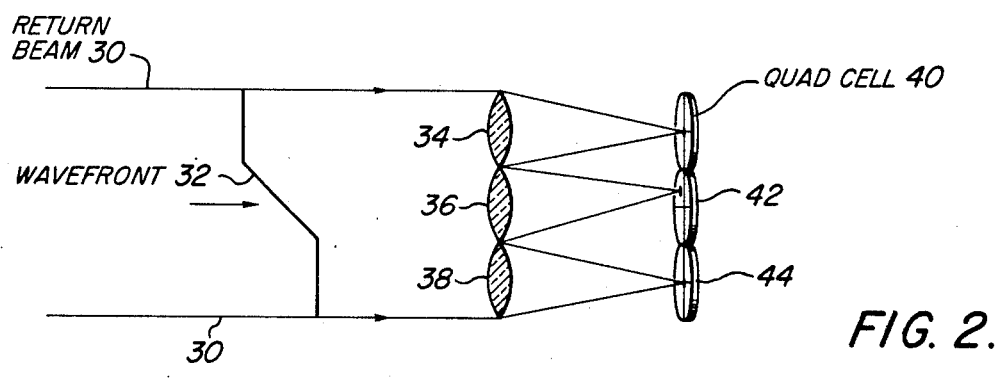
FIG. 2 is a schematic illustration of a conventional Hartmann-type sensor for use in sensing wavefront distortions in a return wave.

FIG. 2 illustrates the operation of a typical Hartmann-type wavefront sensor. Return light beam 30, with associated wavefront 32, is shown entering the system. Wavefront 32 is shown with a tilt at its middle portion for purposes of illustration. Return beam 30 is divided into three subaperture components by the array of lenslets 34, 36 and 38, and these lenslets focus their respective subaperture components onto photodetector cells 40, 42 and 44, respectively. Photodetector cells 40, 42 and 44 may be quad cells of the type where four individual photoconductor or photovoltaic detectors are arranged in four quadrants but separated by a small gap so that their outputs are electrically independent. As can be seen, each of the photodetector cells 40, 42 and 44 is divided into four quadrants. Thus, they can detect the position of the centroid for each focused subaperture component from lenslets 34, 36 and 38. As illustrated in FIG. 2, the tilted portion of wavefront 32 is not focused at the center of photodetector 42 because of its tilt. Of course, in order for the subaperture components of wavefront 12 having no tilt to be focused at the center of their respective quad cells, there must be perfect optical alignment between the focusing lenslets and quad cells.

Figure 3:
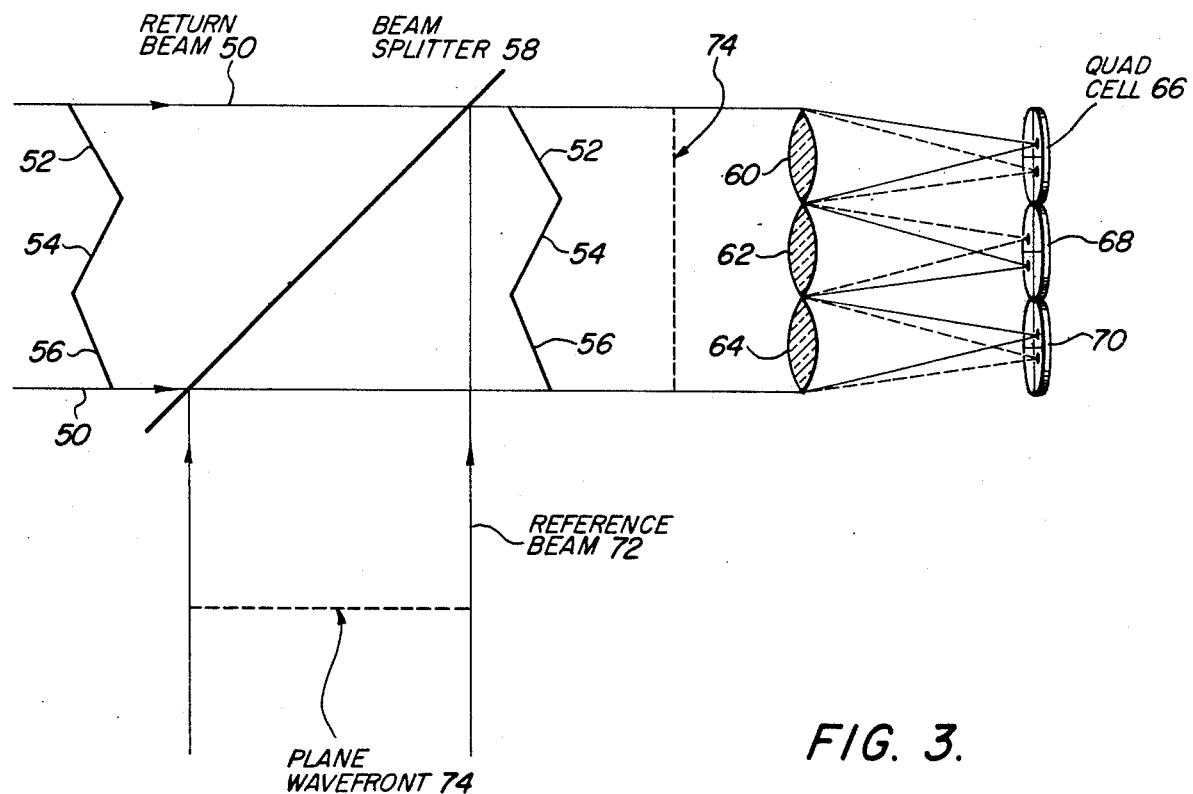
FIG. 3 is a schematic illustration of an improved Hartmann-type sensor employing a modulated reference beam according to this invention.

FIG. 3 illustrates a Hartmann-type sensor employing a modulated reference beam according to the principles of this invention. Return light beam 50 is illustrated as having a wavefront having three distinct tilts 52, 54 and 56. Return beam 50 might be returning from a distant object in space, for example, and its wavefront tilts might have been caused by atmospheric turbulence or other causes. Return beam 50 passes through beam splitter 58 and continues to a lenslet array containing lenslets 60, 62 and 64 which focus subaperture components onto quad cells 66, 68 and 70. As previously discussed, the centroids of the subaperture components of light beam 50 are off-center on quad cells 66, 68 and 70 due to the tilts 52, 54 and 56 in the wavefront.

In this embodiment, reference light beam 72 is also directed towards beam splitter 58 wherein it is combined with return beam 50. Reference beam 72 may be a modulated beam, such as one emitted from a laser source and an acousto-optical modulator which provide 100% amplitude modulation of the reference signal. Additionally, it is preferable to provide a plane wavefront 74 in reference beam 72. Suitable sources of such modulated plane wave light beams are lasers such as continuous wave single mode gas lasers or lasers with pinhole spatial filtering and even pulsed lasers with sufficient spatial filtering. Since reference beam 72 has a plane wavefront, each subaperture component would typically be focused by lenslets 60, 62 and 64 at the centers of quad cell 66, 68 and 70, respectively. However, optical misalignments occur causing even the focal points of plane wave components to be off-center as shown by the dotted lines in FIG. 3. It is only the relative position of focused light beams 50 and 72, however, that are necessary to determine, electronically, the various tilts in the wavefront of subaperture components of return beam 50.

FIG. 4 illustrates a modified Hartmann-type sensor similar to that of FIG. 3 except that nutation mirror 75 is employed to move the focused spots around all four quadrants of quad cells 66, 68 and 70 so that the centroid of the spots can be located. This system produces a.c. components since the spots change position periodically with time. Like elements have been given like numerals in FIG. 4. Alternatively, if a.c. operation is not required, the reference and signal spots in FIG. 3 could be made large enough, such as by defocussing, to overlap all four quadrants, and the nutation is eliminated.

FIG. 5 illustrates the optical components in one embodiment of a sensor apparatus according to this invention. Therein, return light beam 80 passes to beam combiner 82 where it is combined with modulated reference laser beam 84 emitted by laser 86. Combined light beam 88 is then nutated by mirror 90. As the nutated beams move from quadrant to quadrant of the quad cell, an a.c. output is generated by each beam. Focusing lens 92 converges combined nutated light beam 94 and directs it through the aperture in element 96 which serves to limit the adaptive optical system field of view to a small aim point portion of the object image. The aim point must have sufficient contrast detail for the system to operate. Light beam 98 emanating from the aperture is collimated by collimating lens 100 and passes to lenslet array 102, which may be refractive or reflective. Lenslet array 102 divides the combined beams into subaperture components and focuses each subaperture component onto their respective position sensor detectors, such as quad cells in detector array 104. As shown by the exploded view, the return beam is more diffused than the modulated reference beam on the quad cell. However, it is the relative position between the two beams on the quad cell which allows a determination of the tilt of each subaperture component to be made. The output data of the detect array 104 is directed to suitable electronics (now shown) for ascertaining the wavefront tilt in return beam 80 so that proper corrrections in adaptive optical system can be made in an outgoing beam.

FIG. 6 illustrates a sensor system designed with an all-reflective optical system. This system would be useful where the incoming target signal is a broad band of visible or infrared radiation. The reflective optics do not require chromatic corrected lens. In this case, the subaperture lenslet array of FIGS. 2-5 has been replaced by faceted reflective prism 110 which divides the light into separate beams focussed on their respective quad-cell detectors in array 104. The facets of reflective prism 110 are flat planes. To obtain the focus on the quad-cell, this faceted prism is placed in the optical path where the reference and signal beams are converging.

This is accomplished by focusing mirror 112 after the reference signal beam are combined. By this means, only one focussing element is required, whereas in the previous embodiments, separate focussing elements in the lenslet array were required to achieve separate focus on the quad-cells.

FIG. 6 also shows that the faceted reflective prism 110 can be mounted on a nutation drive 114 so that it will also perform the function of the nutating mirror. This allows the separate nutation mirror of the previous figure to be eliminated.

Those skilled in the art will recognize, of course, many equivalents to the components, elements, materials, equipment, and steps specifically described herein. All such equivalents are intended to be covered by the following claims.

What is claimed is:

1. An apparatus for sensing wavefront distortions in a return beam of light from an irradiated or selfilluminated object, comprising, in combination:
   a. means for emitting a modulated reference light beam;
   b. means for combining said return beam with said modulated reference light beam to form a combined light beam;
   c. means for dividing said combined light beam into a plurality of subaperture components;
   d. photosensitive means for detecting the position of light beams focused thereon;
   e. means for focusing each of said plurality of subaperture components of said combined light beam onto said photosensitive means for detecting; and
   f. electronic means for determining the wavefront tilt of said target return beam from the relative positions of the target-return and modulated reference light beams for each of said plurality of subaperture components.

2. The apparatus of claim 1 additionally including means for generating an a.c. signal output from said combined light beam.

3. The apparatus of claim 2 wherein said means for generating an a.c. signal output comprise a nutation mirror.

4. The apparatus of claim 3 wherein said means for dividing and said means for focusing comprise an array of lenslets positioned in the path of said combined light beam.

5. The apparatus of claim 4 wherein said photosensitive means comprises an array of position sensor detectors, each being positioned to receive the focus beams of one lenslet in said array of lenslets.

6. The apparatus of claim 5 wherein said means for emitting a modulated reference light beam comprises a laser which emits light having a plane wavefront and means for amplitude modulating said laser beam.

7. The apparatus of claim 6 wherein said array of position sensor detectors comprises an array of quad cells.

8. The apparatus of claim 1 wherein said means for dividing comprises a faceted mirror.

9. The apparatus of claim 8 wherein said faceted mirror is mounted on a nutation drive and thereby serves as means for superimposing an a.c. signal on said combined beam.

10. In the method of determining the wavefront tilt in a sample light beam by passing said sample light beam through a focusing lens to focus it onto a quad cell detector:

The improvement of combining said sample beam with a modulated reference light beam prior to passing it through said focusing lens whereby the relative positions of the focused sample and reference and said light beams on said quad cell detector is indicative of the wavefront tilt in said sample light beam.

11. The improvement of claim 10 wherein said reference beam is a beam of laser light having a plane wavefront.

12. The improvement of claim 11 additionally including nutation of said combined beam to impose an a.c. signal thereon.

* * * * *